United States Patent [19]

Balhouse

[11] 4,290,580

[45] Sep. 22, 1981

[54] GATE VALVE

[75] Inventor: Harold J. Balhouse, Corona, Calif.

[73] Assignee: Consolidated Controls Corporation, Bethel, Conn.

[21] Appl. No.: 82,967

[22] Filed: Oct. 9, 1979

[51] Int. Cl.³ .................................... F16K 25/00
[52] U.S. Cl. ............................ 251/169; 251/197; 251/199
[58] Field of Search ............... 251/167, 169, 197, 199

[56] References Cited

U.S. PATENT DOCUMENTS 3,610,573  10/1971  Robertson .................. 251/197 X

FOREIGN PATENT DOCUMENTS 2627607  1/1977  Fed. Rep. of Germany ...... 251/169
294108   4/1965  Netherlands .................... 251/169

Primary Examiner—Harold W. Weakley
Attorney, Agent, or Firm—Mason, Kolehmainen, Rathburn & Wyss

[57] ABSTRACT

A new and improved gate valve suitable for use with high pressure, high temperature fluids such as those developed in coal gasification processes and the like which comprises a valve gate assembly including opposed outwardly facing valve discs is bodily movable from a valve open position to a valve seat confronting position in which the valve discs are aligned with but spaced from opposed valve seats in the flow passage. Upon further downward movement of the valve stem the valve discs are moved laterally outwardly into engagement with the valve seats. In order to accommodate situations where the opposed valve seats are spaced relatively close together, the valve discs are mounted on annular spring washers which normally bias said valve discs away from said valve seats. A pair of toggle elements are actuated by downward movement of the valve stem to force the valve discs laterally outwardly into engagement with the valve seats after the assembly has been moved to the valve seat confronting position.

12 Claims, 13 Drawing Figures

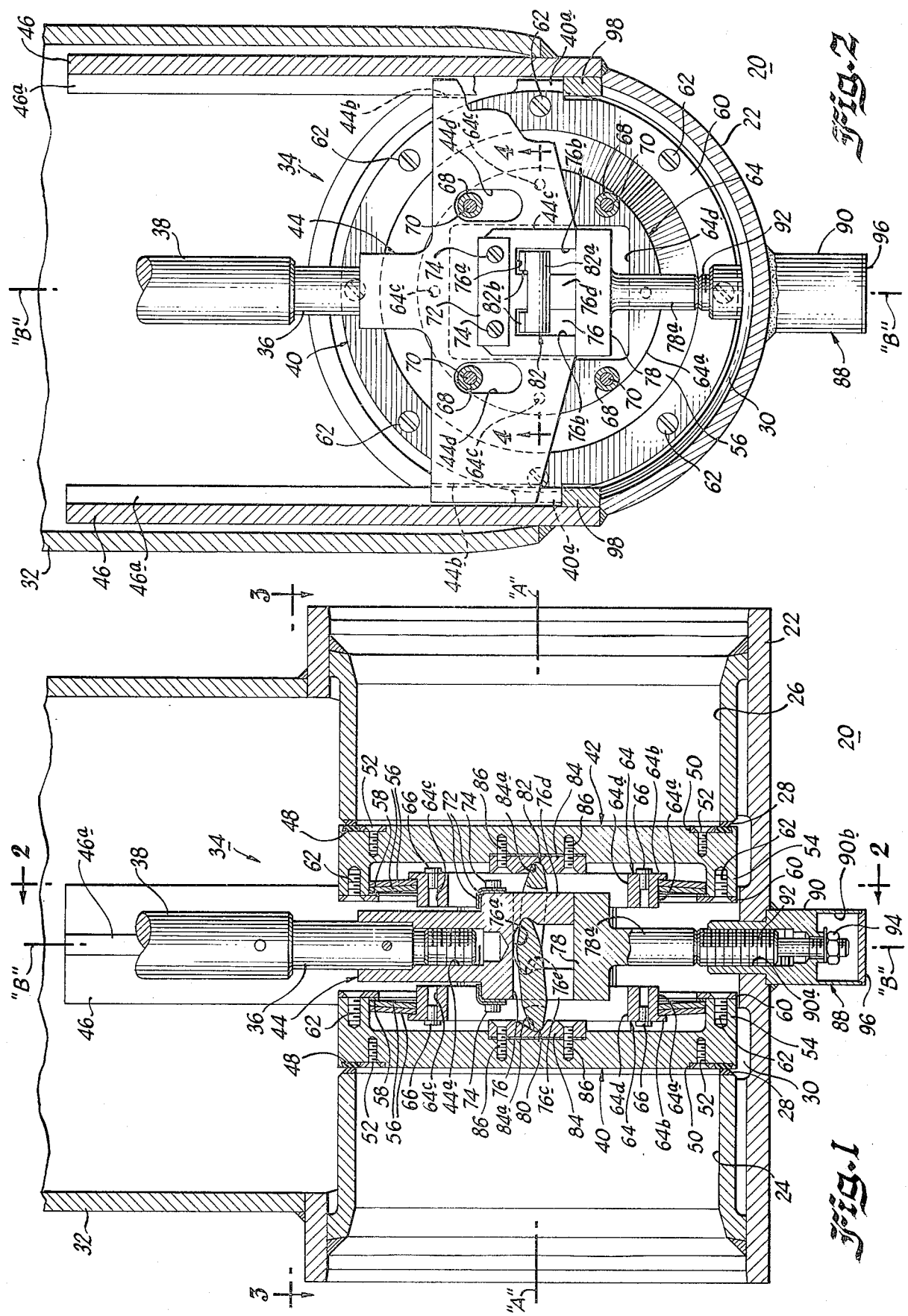

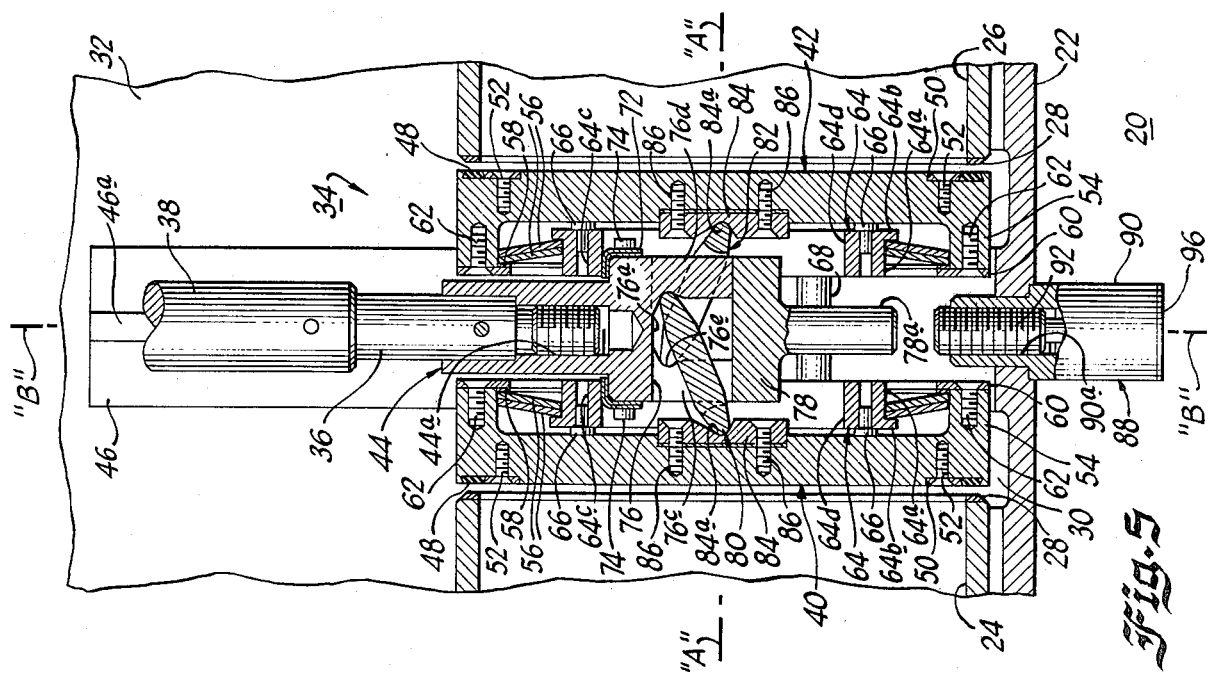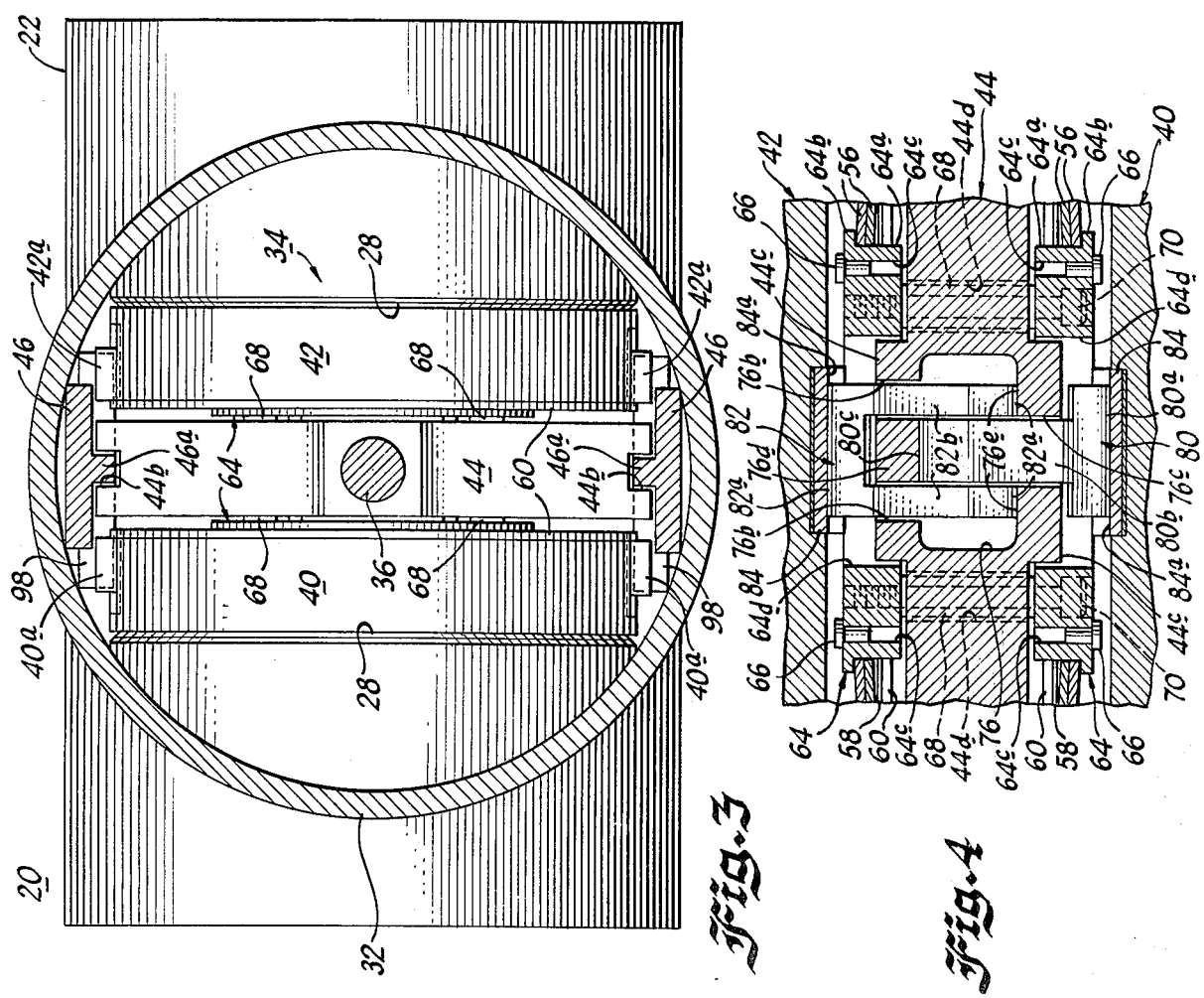

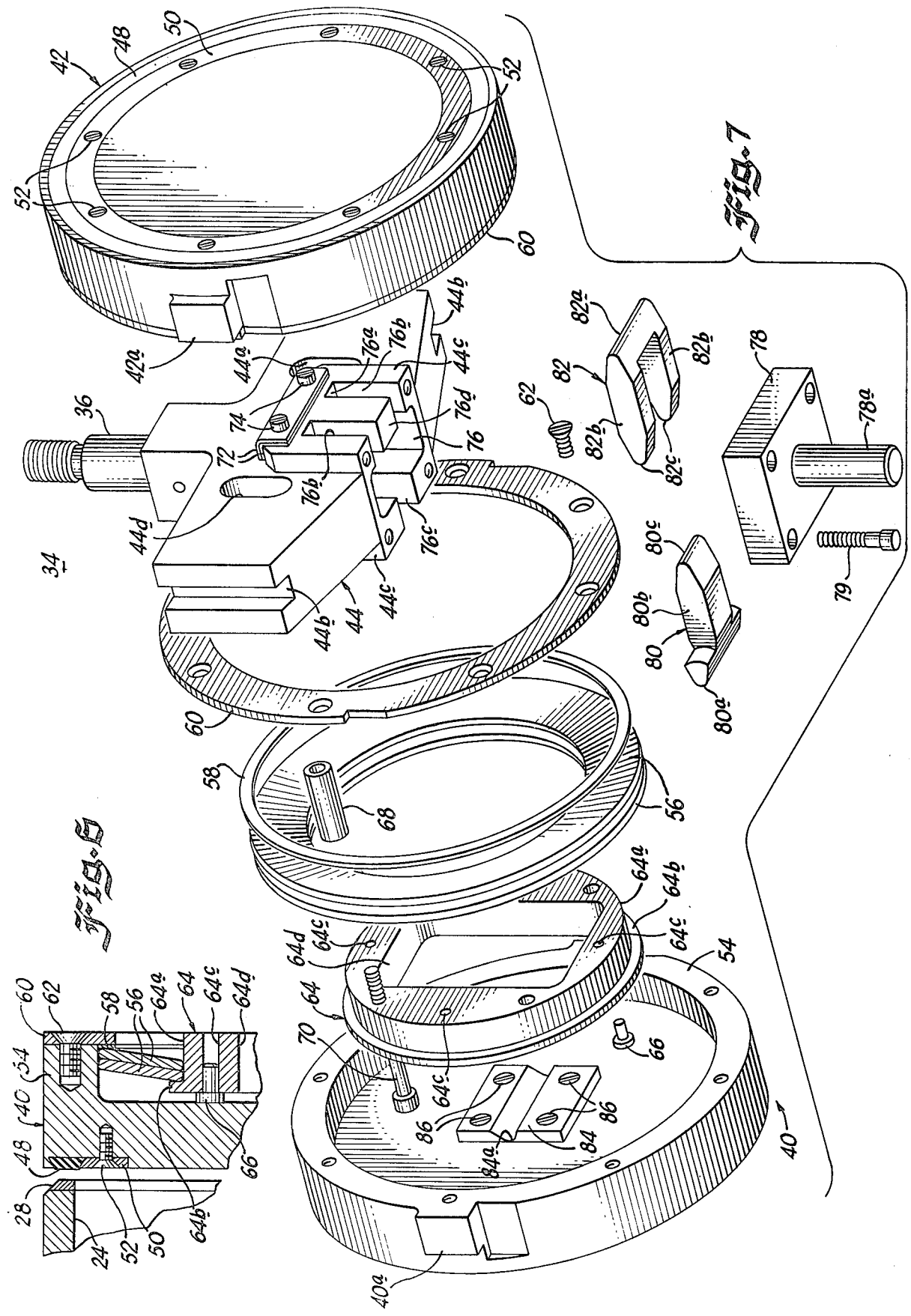

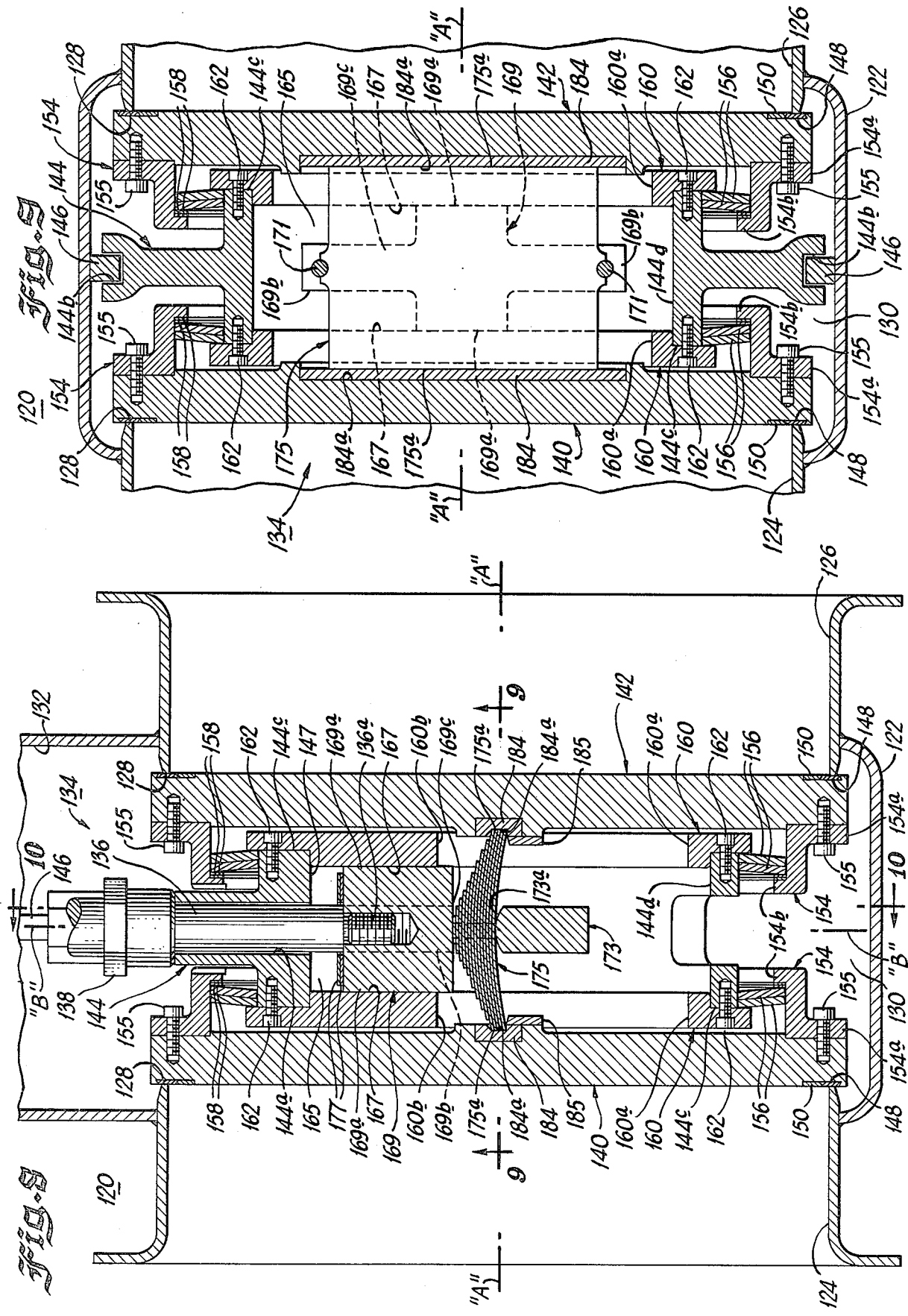

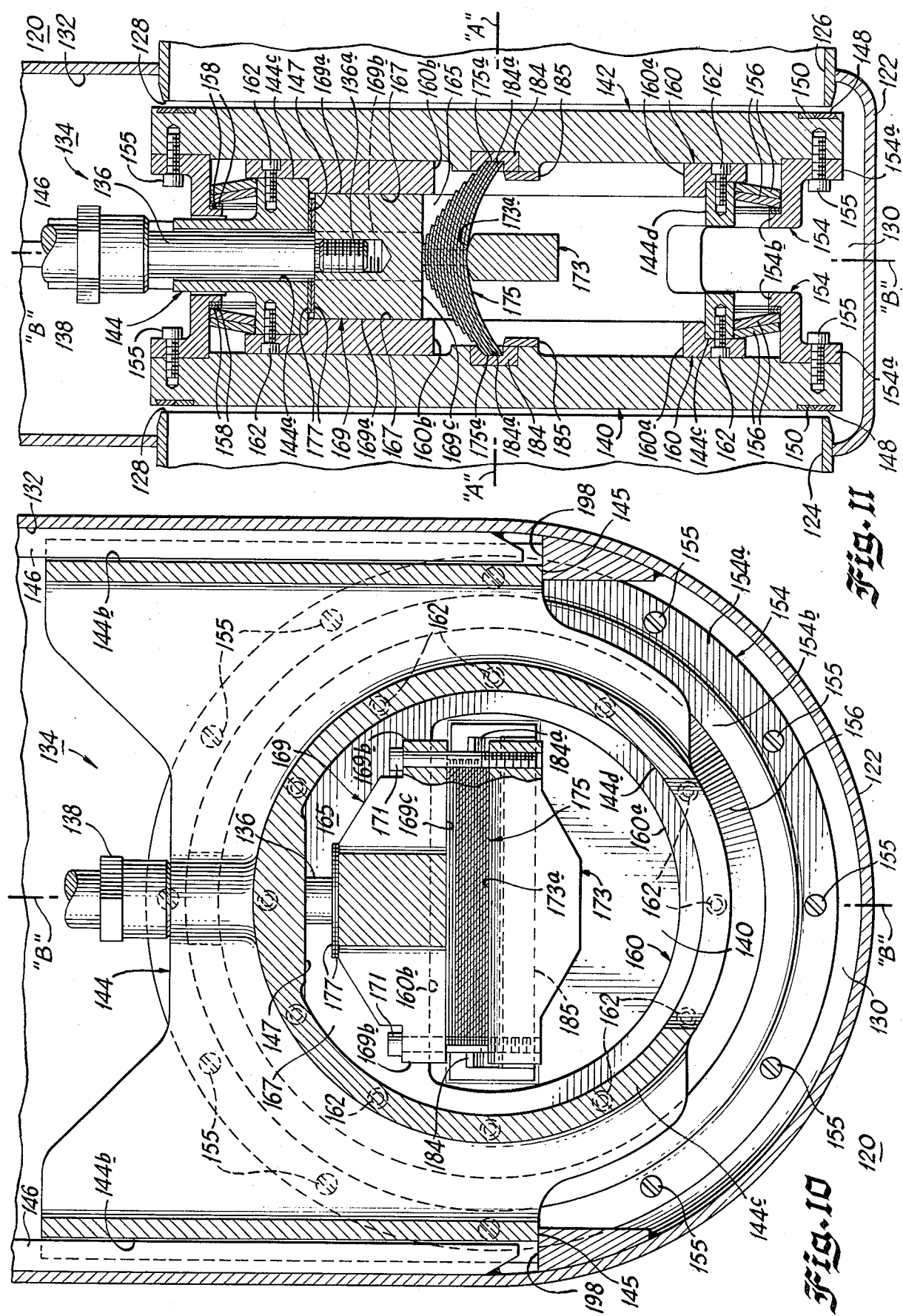

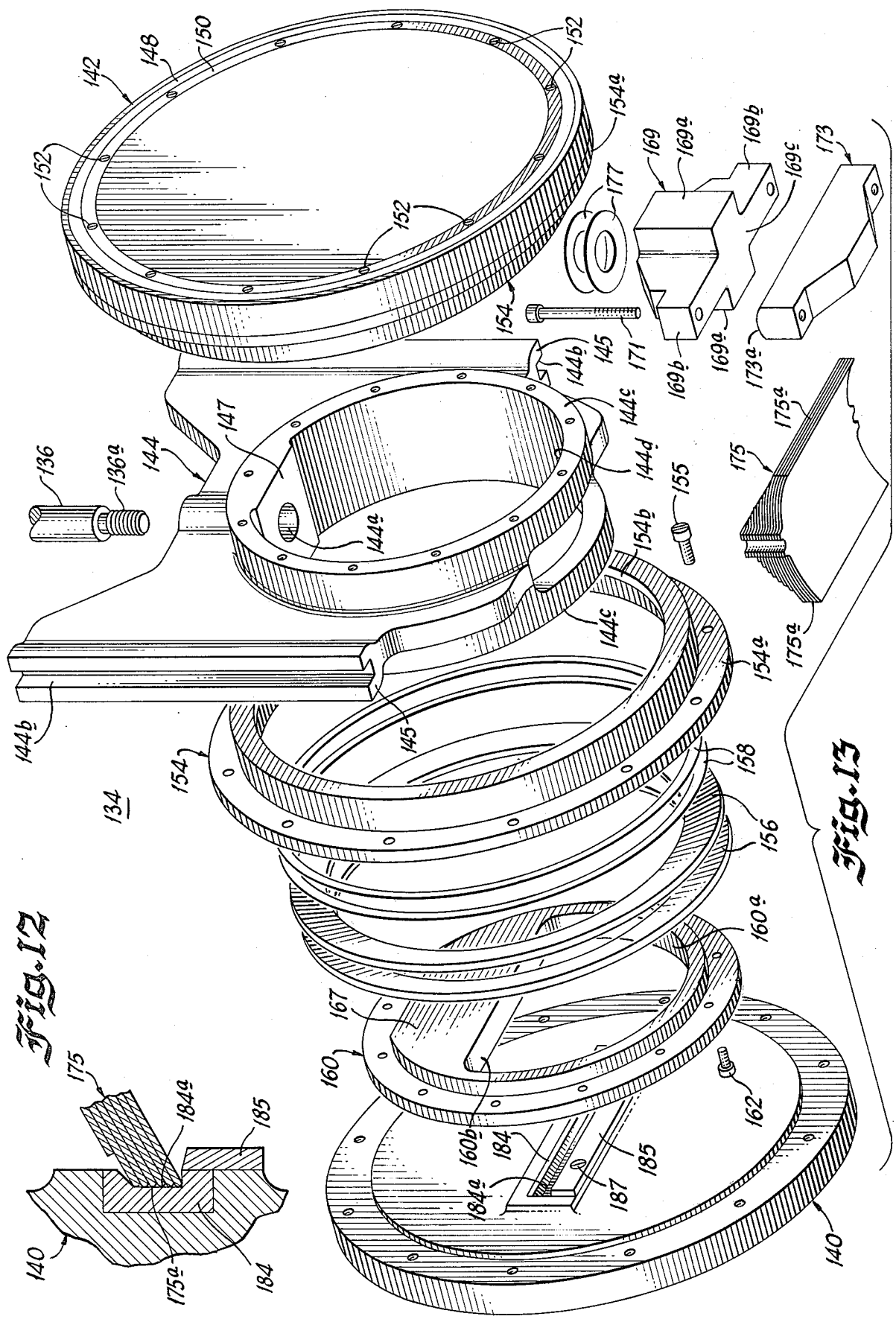

GATE VALVE

BACKGROUND OF THE INVENTION

1. Field of the Invention

The present invention relates to gate valves and more particularly relates to gate valves of the type designed for operation with high temperature, high pressure fluids such as those generated in coal gasification processes and the like. Specifically, the present invention is an improvement of the type of gate valve disclosed in a copending application of Henry A. Waller, Ser. No. 082,969, filed concurrently herewith and assigned to the same assignee as the present invention.

2. Description of the Prior Art

Over the years, a wide variety of gate valves and slide valves of various types have been developed. U.S. Pat. No. 380,037 discloses a valve for steam engines wherein valve members are supported on curved bows and are pressurized to expand against the opposing valve seats. U.S. Pat. No. 1,783,329 discloses a gate valve wherein opposite valve members are biased outwardly against the seats by a pair of coil springs. U.S. Pat. No. 2,541,968 discloses a gate valve wherein sloped wedging surfaces are provided for moving a pair of valve members outwardly against facing annular valve seats. U.S. Pat. No. 2,778,600 discloses a gate valve wherein leaf springs are provided for biasing a pair of valve gates to slide in a longitudinal direction with respect to each other and wedging forces are provided to cause the valve gate to move laterally apart for seating. U.S. Pat. No. 2,826,391 discloses a wedge valve wherein valve elements are wedged outwardly apart against valve seats. Another wedge valve is shown in U.S. Pat. No. 2,861,770. U.S. Pat. No. 3,478,771 discloses a sectional body gate valve with a valve seat scraper device having springs biasing the valve members apart from one another. U.S. Pat. No. 3,815,868 discloses a double disc gate valve wherein rotatable valve discs are used and are wedged apart for seating. Said copending Waller application discloses a double disc gate valve wherein the valve discs are supported by a pair of flexure elements which normally bias the valve discs away from the confronting valve seats when the valve gate assembly is in a valve seat confronting position. The discs are interconnected by an upwardly bowed flexure element which is retained between upper and lower holding members connected to the transversely extending valve stem of the gate valve. A downward force is exerted on said bowed flexure element to flatten it and force the valve discs outwardly into engagement with the opposed valve seats.

OBJECTS OF THE INVENTION

It is an object of the present invention to provide a new and improved gate valve of the character described.

It is another object of the invention to provide a new and improved gate valve especially adapted for operation with high temperature, high pressure, highly abrasive fluids as are commonly generated in coal gasification processes and the like.

Yet another object of the present invention is to provide a new and improved gate valve assembly which is suitable for use in situations where the opposed valve seats are spaced relatively close together.

Still another object of the present invention is to provide a new and improved valve assembly wherein opposed valve discs are supported on annular spring washers which normally bias the valve discs away from their cooperating valve seats as the assembly is first moved transversely into confronting alignment with the valve seats.

Another object of the invention is to provide a new and improved gate valve assembly of the character described wherein a pair of toggle elements are actuated after the assembly has been moved to the valve seat confronting position so as to force the valve discs into engagement with their respective valve seats.

BRIEF SUMMARY OF THE INVENTION

The foregoing and other objects and advantages of the invention are accomplished in an illustrated embodiment comprising a gate valve having a body with a flow passage and opposed annular valve seats formed therein. A gate assembly is mounted for movement transversely of the flow passage along a path between a valve seat confronting position and an open position displaced transversely outwardly of the valve body. The gate assembly includes a pair of annular spring washers for mounting the valve discs for movement toward and away from the valve seats when the gate assembly is in said valve seat confronting position. After the assembly has been moved to said valve seat confronting position, a pair of toggle elements are actuated by downward movement of the valve stem to force the valve discs laterally outwardly into engagement with said valve seats.

BRIEF DESCRIPTION OF THE DRAWINGS

For a better understanding of the invention, reference should be had to the following detailed description, taken in conjunction with the drawings, in which:

FIG. 1 is a longitudinal, cross-sectional view of a new and improved gate valve constructed in accordance with the features of the present invention;

FIG. 2 is a transverse, cross-sectional view taken along lines 2—2 of FIG. 1; but illustrating the valve in a different operative position;

FIG. 3 is a longitudinal cross-sectional view taken substantially along lines 3—3 of FIG. 1;

FIG. 4 is a fragmentary cross-sectional view taken substantially along lines 4—4 of FIG. 2;

FIG. 5 is an enlarged, fragmentary, longitudinal, cross-sectional view similar to FIG. 1, but illustrating the valve in a different operative position;

FIG. 6 is a fragmentary, enlarged cross-sectional view like FIG. 5 illustrating details of the gate valve assembly of the gate valve of FIG. 1;

FIG. 7 is an exploded, perspective view illustrating the components of the gate valve assembly of the gate valve of FIG. 1;

FIG. 8 is a longitudinal cross-sectional view of another embodiment of a gate valve constructed in accordance with the features of the present invention;

FIG. 9 is a longitudinal, cross-sectional view taken substantially along lines 9—9 of FIG. 8;

FIG. 10 is a transverse, cross-sectional view taken substantially along lines 10—10 of FIG. 8;

FIG. 11 is an enlarged fragmentary, cross-sectional view similar to FIG. 8, but illustrating the gate valve in a different operative position;

FIG. 12 is an enlarged, fragmentary, longitudinal cross-sectional view like FIG. 11, but illustrating a detailed of the gate valve assembly; and FIG. 13 is an exploded perspective view illustrating the components of the gate valve assembly of the gate valve of FIG. 8.

DESCRIPTION OF THE PREFERRED EMBODIMENTS

Referring now more particularly to the drawings, in FIGS. 1-7 is illustrated one embodiment of a new and improved gate valve constructed in accordance with the features of the present invention and referred to generally by the reference numeral 20. The valve 20 includes an elongated hollow cylindrical body 22 with a pair of inner cylindrical flow passages 24 and 26 extending inwardly from opposite ends of the valve body and aligned coaxially on a common longitudinal center axis extending through the body and indicated by the reference line A—A (FIGS. 1 and 5). At the inner end of each flow passage there is provided an annular valve seat 28 and the valve seats are spaced apart from one another in direct confronting relation forming an open space defining a valve chamber 30 therebetween.

The valve chamber 30 is in communication with a generally cylindrical housing 32 extending laterally outwardly of the chamber and having a transverse center line B—B extending at right angles to intersect the longitudinal axis A—A of the valve body 22. The housing 32 provides an enclosure for a gate valve assembly generally indicated by the reference numeral 34 which is mounted for transverse movement in opposite directions along the axis B—B between an inside, closed and/or valve seat confronting position within the valve chamber 30 as shown and an outside or open position spaced laterally outwardly of the valve chamber in the housing 32 (not shown). Movement of the gate valve assembly 34 along the axis B—B between the outside and inside positions is controlled by means of an elongated valve stem 36 coaxially aligned on the axis B—B and connected at its outer end portion to a suitable linear valve actuator (not shown) having an actuator sleeve 38.

The gate valve assembly 34 includes a pair of opposed, generally cylindrical, valve members 40 and 42 disposed on opposite sides of a central portion 44 having a threaded internal bore 44a coaxially aligned with the axis B—B and adapted to receive a lower threaded end portion of the stem 36 as shown in FIGS. 1 and 5. The body 44 also includes a pair of key ways or grooves 44b on opposite edges in parallel with the axis B—B on opposite sides adapted to interfit with elongated ribs or tracks 46a formed on a pair of spaced apart parallel guide tracks 46 mounted on opposite sides of the valve chamber 30 and extending upwardly into the stem housing 32. The longitudinal engagement between the tracks 46a and the grooved edges 44b of the valve body 44 provides for precise linear movement of the valve assembly along the axis B—B in a direction transverse to the axis A—A which extends longitudinally of the main body portion 22 of the valve.

Each valve disc is provided with a generally planar, circular outer face having a circular groove adjacent the periphery adapted to contain a circular seat ring 48 having an outer face projecting outwardly slightly from the central portion of the face of the valve disc. The seat rings 48 are adapted to bear and seat against the fixed rings 28 on the respective flow passages 24 and 26. The valve disc seat rings 48 are replaceable as wear occurs and are held in place on the discs with circular wedge rings 50 and a plurality of cap screws 52 as illustrated.

The respective valve discs 40 and 42 include ring-like, cylindrical flange portions or skirts 54 which extend inwardly toward opposite faces of the valve body 44 and these skirts are supported on pairs of frustoconical "Belleville" type spring washers 56, which in an unstressed condition normally bias the respective valve discs 40 and 42 away from seating engagement with the fixed seat rings 28 on the respective flow passages 24 and 26 as shown in FIG. 5. When the "Belleville" spring washers 56 are subjected to compressive forces tending to flatten the rings, the washers permit the valve discs to move outward toward the respective valve seating rings 28 to close off the passages 24 and 26 to provide a valve closed condition as illustrated in FIG. 1. Upon relaxing of these pressures, the "Belleville" spring washers 56 retract the valve discs 40 and 42 away from the respective fixed seating rings 28 back to the spaced apart but directy confronting position as shown in FIG. 5.

The outer peripheral edges of the "Belleville" washers are secured inside the flanges or skirts 54 of the respective valve discs by means of a thin, annular, narrow clamping ring 58 and an annular holding plate 60 mounted on the inner face of the valve disc skirt and held in place by a plurality of cap screws 62 provided at spaced apart circumferentially spaced positions. Each pair of spring washers is in turn supported on a cylindrical, shoulder surface 64a of a valve disc support element 64, which elements are disposed adjacent opposite side faces of the body member 44. The support elements 64 include an outwardly extending radial lip 64b which engages the outer surface of the outermost "Belleville" washer of each pair to retain the washers in place.

Inward movement of the respective valve discs 40 and 42 on their respective valve supports 64 along the axis A—A is limited by engagement of the inside or back wall faces of the valve discs with the headed outer ends of a plurality of stop buttons 66 (FIG. 6) having shanks seated in openings 64c formed at equilaterally spaced locations around each valve support element as best shown in FIG. 7. The respective valve disc support elements 64 on opposite sides of the body 44 are interconnected together as a unit by pairs of upper and lower, hollow spacer sleeves 68 which extend between inside faces of the support elements and as shown in FIGS. 4 and 7, socket head cap screws 70 are provided and pass through the hollow bore of the sleeves to hold the valve support elements in parallel spaced apart relation as illustrated. The cap screws are threaded into aligned threaded bores on the valve support element 64 adjacent the valve disc 42 as illustrated. Each valve support element is provided with a large rectangular opening 64d in the central portion thereof in order that the support elements 64 and the valve discs 40 and 42 carried thereby may move a limited amount relative to the valve body 44 in a direction parallel of the axis B—B.

Opposite side surfaces of each opening 64d are in juxtaposition with guide surfaces 44c normal to the opposite, main faces of the body 44 and projecting outwardly thereof. The guide surfaces are formed as opposite sides of the boss-like projections on the central portion of the body. The interaction between projections and the large rectangular openings provides a keway type relationship between the pair of interconnected support elements 64 on the one hand and the central body member 44 disposed therebetween.

The upper pair of spacer sleeves 68 and connecting cap screws 70 are accommodated in a pair of elongated vertical slots 44d formed in the body 44 on opposite sides of the axis B—B and the lower pair of sleeves and cap screws are disposed below the lower end of the body as best shown in FIG. 2. This arrangement provides for a generally unobstructed relative movement parallel of the axis B—B between the valve disc supports 64 and the body 44 in keyed engagement therewith. The upper and lower surfaces of the rectangular openings 64d in the support elements limit the amount of this relative movement. Adjacent the upper edge of the boss-like projections on opposite sides of the body 44 there is provided pairs of bearing shims 72, each shim having an angular cross-section as shown in FIGS. 1, 5 and 7. The shims are secured to opposite faces of the boss-like projecting portions by means of cap screws 74 so that the upper flanges of the shims provide a wear surface between the facing upper surfaces of the enlarged rectangular openings 64d in the valve supports 64 and the adjacent upper faces of the projections on the opposite sides of the body 44.

Each time the gate valve assembly 34 is moved upwardly out of the confronting position as shown in FIG. 5, to a fully open position (not shown) wherein the valve assembly is spaced upwardly of the body 22 and out of the flow path extending between the passages 24 and 26, the weight of the valve support elements 64 and associated valve discs 40 and 42 and components is supported by the boss-like projection on opposite sides of the body 44 and the shims or wear plates 72 carry this load and distribute the same more uniformly onto the surface of the main body. Should wear occur from time to time, the angle shaped shims may be readily replaced by removing the cap screws 74.

In accordance with the present invention, the lower portion of the body 44 is formed with a relatively large upwardly extending axially disposed recess 76 of generally rectangular transverse cross-section. The recess terminates in an upper surface 76a transverse to the axis B—B and is provided with a pair of slots 76b opening outwardly on one side of the outward boss-like projection facing the valve disc 42. On the opposite side there is provided a single opening slot 76c which faces the opposite valve disc 40. The bottom of the recess 76 is closed off by means of a rectangular bottom plate 78 held in place by a plurality of cap screws 79 and is formed with an integral, downwardly depending cylindrical stop element 78a axially aligned with the axis B—B. The internal recess 76 in the body 44 and the side opening slots 76b and 76c thereof accommodate a pair of outwardly extending toggle elements 80 and 82 adapted to bias the respective valve discs 40 and 42 outwardly to seat or close against the respective seating rings 28 on the flow passages 24 and 26. The inside or back face of each valve disc is formed with a rectangular recess in which is seated a pressure plate 84 secured in place by cap screws 86 and the pressure plates are formed with a laterally extending groove 84a (FIG. 7) adapted to receive a rounded, outer end or nose portion 80a or 82a of a respective toggle element. The toggle element 80 includes a single leg portion 80b extending inwardly at right angles to its outer nose portion 80a and the leg extends into the central portion of the recess 76 through the single, side slot 76c so that a rounded inner end portion 80c directly bears against an opposite wall portion or finger 76d defined between the opposite side slots 76b as shown in FIGS. 1, 5 and 4. The opposite toggle member 82 includes a pair of spaced apart legs 82b extending inwardly at right angles to the rounded outer nose portion 82b and the legs project through the slots 76b on opposite sides of the finger 76b and the leg 80b of the opposite toggle. Each leg 82b is provided with a rounded, inner end portion which is seated in a groove formed in the inside wall surface 76e of the recess on both sides of the single slot 76c as shown in FIGS. 1, 4 and 5. The "Belleville" spring washers 56 normally bias the valve discs 40 and 42 inwardly until the back faces of the discs bear against the stop buttons 66 as shown in FIG. 5, and in this position, the outer faces of the seat rings 48 are in spaced apart but directly confronting relation with the respective fixed seating rings 28 on the fluid passages 24 and 26. When the valve assembly 34 is in the confronting position, as shown in FIG. 5 with the valve discs 40 and 42 aligned coaxially along the axis A—A with the respective flow passages 24 and 26, the biasing forces of the "Belleville" spring washers 56 cause the toggle elements 80 and 82 to be forced inwardly into the recess 76 in the lower portion of the body 44 and this action in turn elevates the valve body towards the upper end of the large rectangular openings 64d in the interconnected valve support elements 64 so that the top surfaces of the openings are in contact with the shims 72 as shown. In this position, the valve discs 40 and 42 are maintained in an innermost position with respect to the body 44 and are out of seating or closed engagement with the fixed valve seat rings 28 on the respective flow passages.

In accordance with the present invention, each of the valve discs 40 and 42 is provided with a pair of radially extending, diametrically opposed, integral stop lugs 40a and 42a, respectively, which lugs are adapted to engage a pair of lateral stop elements 98 provided at the inner ends of the guide tracks 46 as best shown in FIG. 2. The stop elements 98 are aligned to extend longitudinally of the main body 22 on opposite sides of the axis A—A and the upper surfaces are adapted to engage facing lower surfaces of the respective valve disc stop lugs 40a and 42a when the valve discs are positioned in coaxial alignment on the longitudinal axis A—A.

When the gate valve assembly 34 is moved inwardly into the valve chamber 30 from the housing section 32 along the axis B—B, the stop lugs 40a and 42a on opposite sides of each valve disc 40 and 42, respectively, engage the upper surfaces of the stops 98 and thereafter maintain the respective valve discs in coaxial alignment with the axis A—A as further travel of the valve actuator sleeve 38 continues. This further travel of the body 44 results in toggle elements 80 and 82 being thrust outwardly to move the valve disc seating rings 48 on the respective valve discs 40 and 42 outwardly from the confronting but spaced apart position of FIG. 5 to close and seat against the fixed valve discs 28 on the respective flow passages 24 and 26 as shown in FIG. 1. As this occurs the "Belleville" washers 56 are flattened out and are stressed to continuously maintain the faces of the valve discs in precise parallelism with the outer faces of the valve support elements 64 so that accurate and extremely tight closing action between the cooperative valve seat rings 28 and 48 is obtained. In this connection, it will be noted that the toggle elements 80, 82 are positioned in overlapping relation so that the valve gate assembly of the present invention can be used with gate valves having a very small spacing between the opposed valve seats 28. It will also be noted that the rolling contact between the ends of the toggle elements 80, 82 and the grooves 84a tends to prevent a buildup of material between these two surfaces due to the extreme pressure produced between these rolling surfaces, so that sticking and jamming of the valve discs is avoided.

In accordance with a further aspect of the present invention, there is provided an adjustable stop assembly 88 mounted on the body 22 and including a generally cylindrical housing or sleeve 90 having a threaded internal bore 90a aligned on the axis B—B. The sleeve 90 projects inwardly into the valve chamber 30 via a lateral opening provided in the main body 22 of the valve housing and an adjustable, threaded stop member 92 is mounted in the threaded bore 90a. A lock nut 94 is provided on the outer end portion of the elements 92 to fix the position of the stop element in the housing 90 when selected. The lock nut 94 is accessible from the exterior of the valve chamber 22 and is encased within an outer housing portion or bore 90b having a removable cover element 96.

The adjustable stop element 92 is adjusted in position so that seating forces will be limited at the point when the stop element 78a strikes the upper end of the adjustable stop 92 thereby preventing further travel of the actuator sleeve 38. The stop element 92 is adjustably positioned within the sleeve bore 90a so that at this position, adequate but not excessive seating pressure between the valve disc seating rings 48 and the fixed seat rings 28 on the respective flow passages 24 and 26 is achieved. The result is an extremely efficient and tight closing action with the gate valve assembly 34.

When it is desired to open the gate valve assembly, the stem 38 is withdrawn upwardly along the axis B—B and initially as this occurs, the toggle elements 80 and 82 are permitted to move inwardly and upwardly in the central recess 76 within the body 44 as the "Belleville" washers 56 positively retract the valve discs away from the closed or seated position and out of contact with the fixed seat rings 28. As this retraction occurs, the shims 72 on the upper edge of the boss-like projections on the valve body 44 move upwardly within the rectangular openings 64d of the valve support elements 64 until the shims engage the upper surface of the enlarged opening as shown in FIG. 5. In this position, the valve disc seating rings 48 are well out of contact and spaced apart from the fixed seating rings 28. Continued upward withdrawal of the sleeve 38 and valve assembly 34 never results in any abrasive type scraping action between the cooperative pairs of rings 28 and 48. The "Belleville" type spring washers 56 provide for precision controlled positive movement of the valve discs 40 and 42 away from seating engagement with the fixed seat rings 28 along the axis A—A and therefor eliminate any possibility of abrasive scraping action between the seating surfaces. Once separation is positively obtained and the valve discs are in the confronting, but spaced apart position as shown in FIG. 5, continued upward further travel of the valve operator sleeve 38 results in an upward withdrawal of the entire gate valve assembly 34 without any frictional contact whatsoever between the previously mated valve seat surfaces.

The resulting action provides an automatically controlled valve operating sequence wherein inward travel of the gate valve assembly 34 from an upper position in the housing 32 along the axis B—B toward the chamber 30 first results in movement of the gate valve assembly into a direct confronting position (FIG. 5) wherein the valve discs 40 and 42 are maintained in the coaxially aligned position with respective valve seats 28 on the fluid passages 24 and 26 before any movement along the axis A—A by the valve discs 40 and 42 toward the fixed seats 28 is commenced. Continued inward travel of the operator sleeve 38 thus causes simultaneous, coaxial movement of the valve discs 40 and 42 in opposite directions from the confronting position of FIG. 2 toward a fully seated or closed position of FIG. 1. When thus fully seated, further travel of the valve operating sleeve 38 along the axis B—B is terminated by engagement of the stop element 78a with the adjustable stop member 92.

Subsequently, when it is desired to open the valve, the stem 38 is withdrawn upwardly and initially this withdrawal results in movement of the respective valve disks 40 and 42 along the axis A—A out of the closed position into the confronting position of FIG. 5 wherein the pairs of valve seat rings 28 and 48 are spaced apart and out of engagement or contact with one another. Continued travel of the sleeve 38 results in a full withdrawal of the gate valve assembly 34 out of the chamber 30 into the the stem chamber 32 without any frictional contact or binding between the pairs of valve seat rings 28 and 48.

From the foregoing it will be seen that the novel valve 20 provides an extremely efficient and highly wear resistant operation suitable for use with highly abrasive fluids such as those developed in coal gasification and coal liquification processes.

Referring now more particularly to FIGS. 8 through 13 therein is illustrated another embodiment of a valve constructed in accordance with the features of the present invention and referred to generally by the reference numeral 120. The same or similar reference numerals with the added prefix "1" will be used to describe and identify components of the valve 120 which are the same or similar to those of the valve 20 of the previous embodiment of FIGS. 1 through 7 and only the significant differences between the two embodiments will be described in detail.

Both valves 20 and 120 herein described, operate in substantially the same manner and with substantially the same principles of operation. The valve 120 includes a cylindrical body 122 with a pair of flow passages 124 and 126 at opposite ends aligned on a common longitudinal axis A—A. Each flow passage includes a circular seating ring 128 at the inner end, and between the seating rings there is provided an enlarged valve chamber 130. The valve includes an outer stem chamber or housing 132 projected outwardly of the main body 122 with a longitudinal axis B—B intersecting at right angles to the axis A—A. The stem chamber 132 is adapted to hold and enclose a transversely movable gate valve assembly 134 which is mounted for reciprocation along the transverse axis B—B into and out of the valve chamber 130 between the seat rings. An operator sleeve 138 interconnected with a stem 132 as illustrated is provided to move the gate valve assembly 134, which includes a pair of circular valve discs 140 and 142 mounted on opposite sides of a main body 144. The body is formed with a cylindrical bore 144a along the axis B—B to slidably accommodate the stem 136 which is slidably disposed therein for limited movement between stop surfaces. The body is also provided with a pair of laterally oppositely extending, transverse wing portions, each having a longitudinal edge groove 144b defined therein. The grooves are aligned in parallel on opposite sides of the transverse axis B—B, and the gate valve assembly 134 is guided for precise linear sliding movement into and out of the valve chamber 130 along the axis B—B by the grooves of the wing portions which slide along tracks 146.

The valve body 144 is provided with a pair of stop surfaces 145 at the lower end of the guide grooves 144b on the wing portions and these stop surfaces engage the upper surfaces of a pair of elongated stop elements 198 mounted parallel of the longitudinal axis A—A on opposite sides thereof and secured to the valve body 122 as shown in FIG. 10. Engagement of the stop surfaces 145 of the body 144 on the stops 198 limits further inward travel of the valve body along the axis B—B. In the stop engaged position, as shown in FIG. 10, the valve discs 140 and 142 are positioned in coaxial alignment with the longitudinal axis A—A of the flow passages 124 and 126 so that when the valve discs are subsequently moved outwardly in opposite directions from opposite sides of the valve body along the axis A—A, the dis s are pressed into seating engagement against the seating rings 128 of the flow passages 124 and 126 as shown in FIGS. 8 and 9.

On the inside face of each of the valve discs 140 and 142 there is provided an annular support ring or skirt 154 having a radial flange 154a attached to the adjacent valve disc by a plurality of circumferentially spaced apart cap screws 155. The flanges 154a are seated in grooves formed around the periphery on the inside face of the respective valve discs 140 and 142. Each support ring includes a cylindrical internal bore adapted to receive and contain a pair of "Belleville" type spring washers 156 of frustoconical shape and these washers are retained within the bore of the rings by means of an internal, radial flange 154b on the support rings. Shims 158 are interposed between spring washers 156 and flanges 154b to adjust the initial load on the spring washers 156.

The respective pairs of "Belleville" spring washers 156 are mounted on a pair of oppositely outwardly projecting, annular, ring-like bosses 144c formed on opposite side faces of the body 144 and these bosses define a wall around the periphery of an enlarged opening or recess 144d extending between opposite side faces of the body in the direction of the axis A—A. At the upper end, the recess 144d is bounded by planar or flat stop surface 147 in communication with the bore 144a for receiving the stem 136.

The frustoconical "Belleville" washers 156 are retained on the circular bosses 144c by means of holding plates or rings 160 secured thereto by circumferentially spaced apart cap screws 162. Each holding ring includes a large opening 160a having a curved lower periphery and a flat or chordal upper surface 160b and above the flat edge of the enlarged openings, wall portions 167 of the holding rings 160 provide a cavity or slide chamber 165 bounded on opposite sides by inside faces of the wall portions 167 and on the upper surface by the stop surface 147. A slide block 169 of generally cruciform shaped transverse cross-section is disposed for limited relative sliding movement along the axis B—B within the slide chamber 165 between the walls 167 of the holding rings 164. The slide block 169 is threadedly secured to a lower threaded end portion 136a of the stem and includes opposite side faces 169a which slidably engage the side wall surfaces 167. The cruciform slide includes a pair of laterally outwardly extending wing portions 169b and these are interconnected by means of cap screws 171 to a lower spring holding compression member 173 having a rounded upper surface 173a which bears upwardly against a central portion on the curved bottom of a multiple element, leaf spring 175 sandwiched between the rounded upper surface 173a and a flat bottom surface 169c of the cruciform shaped guide block 169.

The multiple element, leaf spring 175 includes opposite outer edge portions 175a seated in grooves 184a formed in pressure plates 184 which are mounted on the inside faces of the respective valve discs 140 and 142. These pressure plates are secured in place by means of holding strips 185 and cap screws 187 and as illustrated in FIGS. 11 and 12. When the cap screws 171 are drawn up tightly the lower spring holder 173 engages the underside of the multiple layer, leaf spring 175 and urges the spring tightly against the underside 169c of the slide block.

In an unstressed condition, the outer edges 175a of the spring, droop or curve downwardly and the "Belleville" spring washers 156 are effective to bias the valve discs 140 and 142 inwardly toward each other and out of seating engagement with the valve seat rings 128 on the respective flow passages 124 and 126. From the position shown in FIG. 9, further downward movement of the stem 136 causes the spring 175 to flatten or straighten out and this biases the valve discs 140 and 142 outwardly along the axis A—A in opposite directions to seat and close against the seating rings 128 of the flow passages. Upward withdrawal of the stem 136 permits the cruciform slide block 169 to move upwardly in the internal chamber 167 of the valve body 144 and this in turn permits the "Belleville" spring washers 156 to first move the valve discs away from the seats 128 along the axis A—A to the retracted but confronting position as shown in FIG. 11. Continued upward withdrawal of the stem causes the entire gate valve assembly 134 to move bodily upwardly along the axis B—B until the entire gate valve assembly is out of the fluid flow path extending between the opposed flow passages 124 and 126. Suitable shim washers 177 are provided on the stem 136 between the upper surface of the slide block 169 and the stop surface 147 of the body.

Although the present invention has been described with reference to several illustrated embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A gate valve comprising:
   a valve body including a flow passage having a pair of spaced apart annular valve seats defining a valve chamber therebetween;
   a valve gate assembly including a base mounted for transverse movement relative to said passage, a pair of valve discs and a pair of annular spring washers for supporting said discs from said base, said annular spring washers being supported on said base concentrically with said valve discs and normally biasing said discs toward each other so that said assembly can be moved into and out of said chamber without engaging said valve seats;
   actuator means for moving said assembly in a given direction from a valve open position in which said assembly is laterally disposed with respect to said valve chamber to a valve seat confronting position in which said discs are aligned with but spaced from said valve seats;

and toggle means interconnecting said actuator means and said discs and operative when said assembly is in said valve seat confronting position for moving said valve discs into engagement with said valve seats against the force of said concentric annular spring washers.

2. The gate valve of claim 1 which includes stop means for limiting travel of said assembly in said given direction when said assembly is in said valve seat confronting position, said toggle means being operative in response to further movement of said actuator means in said given direction after said assembly has engaged said stop means for moving said valve discs into engagement with said valve seats.

3. The gate valve of claim 2, which includes additional stop means for limiting travel of said actuator means in said given direction, thereby limiting the maximum force with which said valve discs are held against said valve seats by said toggle means.

4. The gate valve of claim 2, wherein said toggle means comprises means defining a groove in each of said valve discs, a pair of toggle elements each having one end thereof in engagement with one of said grooves, and means defining cooperating recesses in said actuator means for receiving the other ends of said toggle elements and positioning said toggle elements so that further movement of said actuator means after said assembly has engaged said stop means is effective to move said one ends of said toggle elements outwardly and force said valve discs into engagement with said valve seats.

5. The gate valve of claim 4, which includes means for limiting movement of said actuator means in said given direction, thereby to limit the force exerted by said toggle elements on said valve discs when said valve discs are in engagement with said valve seats.

6. The gate valve of claim 4, which includes means for limiting movement of said actuator means relative to said base member in a direction opposite to said given direction, whereby movement of said actuator means in said opposite direction is effective to move said valve gate assembly to said valve open position.

7. The gate valve of claim 2, wherein said stop means comprises fixed stop members for said valve discs which are adapted to engage cooperating shoulders on said discs when said assembly is positioned in said valve seat confronting position.

8. The gate valve of claim 4, wherein said toggle elements have rounded end portions in rolling contact with said grooves and said recesses, whereby the pressure exerted on said toggle elements by said actuator means is effective to prevent the build-up of deposited material between said rounded end portions and said grooves and recesses.

9. The gate valve of claim 1, wherein said base member comprises a pair of spaced apart support members each having an annular flange on an outer edge thereof, said valve discs each having an annular flange on an inner edge thereof, and said pair of annular spring washers being positioned between the annular flanges of said support members and said valve discs and normally biasing said discs toward each other so that said assembly can be moved into and out of said chamber without engaging said valve seats.

10. The gate valve of claim 9, wherein said toggle means comprises means defining a groove in each of said valve discs, a pair of toggle elements extending through clearance openings in said spaced apart support members and each having one end thereof in engagement with one of said grooves, and means defining recesses in said actuator means for receiving the other ends of said toggle elements.

11. A gate valve comprising:
a valve body including a flow passage having a pair of spaced apart annular valve seats defining a valve chamber therebetween;
a valve gate assembly including a base mounted for transverse movement relative to said passage, a pair of valve discs, a pair of annular spring washers supported from said base and supporting said valve discs so that they are normally biased toward each other and said assembly can be moved into and out of said chamber without engaging said valve seats;
actuator means for moving said assembly in a given direction from a valve open position in which said assembly is laterally disposed with respect to said valve chamber to a valve seat confronting position in which said valve discs are aligned with but spaced from said valve seats;
means defining a groove in each of said valve discs;
a pair of toggle elements each having one end thereof in engagement with one of said grooves; and
means defining recesses in said actuator means for receiving the other ends of said toggle elements whereby movement of said actuator means in said given direction after said assembly has been moved to said valve seat confronting position is effective to move said one ends of said toggle elements outwardly and force said valve discs into engagement with said valve seats.

12. The gate valve of claim 11, wherein said toggle elements have rounded end portions in rolling contact with said grooves and said recesses, whereby the pressure exerted on said toggle elements by said actuator means is effective to prevent the build-up of deposited material between said rounded end portions and said grooves and recesses.

* * * * *